United States Patent
Ohlson et al.

[11] Patent Number: 5,855,444
[45] Date of Patent: Jan. 5, 1999

[54] DEVICE FOR CENTERING A ROTATIONAL UNIT

[75] Inventors: Rolf Ohlson, Nol; Mats Fagergren, Kungälv, both of Sweden

[73] Assignee: AB Volvo, Sweden

[21] Appl. No.: 553,717

[22] PCT Filed: May 30, 1994

[86] PCT No.: PCT/SE94/00514

§ 371 Date: Jan. 31, 1996

§ 102(e) Date: Jan. 31, 1996

[87] PCT Pub. No.: WO94/28324

PCT Pub. Date: Dec. 8, 1994

[30] Foreign Application Priority Data

Jun. 1, 1993 [SE] Sweden .................................. 9301853

[51] Int. Cl.⁶ .................................................. F16D 65/10
[52] U.S. Cl. .......................... 403/13; 29/525; 29/894.361; 403/282; 403/273
[58] Field of Search .................. 29/525, 894.361; 403/13, 282, 285, 273

[56] References Cited

U.S. PATENT DOCUMENTS

| | | | |
|---|---|---|---|
| 1,375,852 | 4/1921 | Linendoll | 29/525 X |
| 1,776,615 | 9/1930 | Boothman et al. | 403/285 X |
| 2,603,017 | 7/1952 | Merrill | 29/525 |
| 2,779,641 | 1/1957 | Sutowski | 29/525 X |
| 3,074,292 | 1/1963 | Polmon | 29/525 |
| 3,349,649 | 10/1967 | Mele | 29/525 |
| 3,734,697 | 5/1973 | Sieghartner | 29/525 X |
| 4,376,333 | 3/1983 | Kanamaru et al. | 403/285 X |
| 4,416,564 | 11/1983 | Billet et al. | 403/282 |
| 4,640,641 | 2/1987 | Edelmayer | 403/282 X |
| 5,074,025 | 12/1991 | Willard, III | 29/525 X |
| 5,320,587 | 6/1994 | Bodtker et al. | 29/525 X |

FOREIGN PATENT DOCUMENTS

| | | |
|---|---|---|
| 1004611 | 4/1952 | France . |
| 459517 | 7/1989 | Sweden . |
| 2019528 | 10/1979 | United Kingdom . |
| WO 93/18311 | 9/1993 | WIPO . |

*Primary Examiner*—Brian K. Green
*Assistant Examiner*—Andrea Chop
*Attorney, Agent, or Firm*—Lerner, David, Littenberg, Krumholz & Mentlik

[57] ABSTRACT

A device for centering a rotational unit on a rotatable hub for rotation of the unit together with the hub. A centering surface which extends around the circumference of the hub extends essentially from a mounting edge for the rotational unit to a stop surface which determines the axial position of the rotational unit. The rotational unit presents in a corresponding way a centering surface which in its one end transcends into a stop surface, which determines the radial position and which is intended for contact with the stop surface of the hub. One of the centering surfaces is divided into a first centering section with a certain larger clearance to the second centering surface and a second centering section with a certain smaller clearance to the second centering surface. The first centering section extends across the main part of the axial distance from the stop surface of the hub to its mounting edge. The second centering section extends across a minor section of the axial distance from the stop surface to the mounting edge of the hub.

17 Claims, 3 Drawing Sheets

DEVICE FOR CENTERING A ROTATIONAL UNIT

TECHNICAL FIELD

The present invention relates to a device for centering a rotational unit, on a rotational hub. More specifically, the invention relates to a device wherein both the hub and the rotational unit have mounting surfaces for guiding the position of the rotational unit both axially and radially.

BACKGROUND OF THE INVENTION

In many applications it is of great importance that the rotating units are properly centered in relation to their axes of rotation. Such rotational units, which are mounted on a rotary hub via mounting surfaces, normally present centering surfaces, shaped as cylinder mantles, which are centered against corresponding centering surfaces, shaped as cylinders mantles, on the hub. Since, for production reasons, a certain tolerance range for the centering surfaces of both the rotational unit and the hub exists, the centering surfaces must be dimensioned in such a way that a certain minimum permitted clearance is assured. In certain cases, the clearance may become so large that, to a great extent, the rotational unit becomes excentrically mounted on the hub and that there is an increased risk for it becoming stuck due to rust, which makes its removal more difficult.

Applications in which eccentrically mounted rotational units may involve functional problems are for example brake drums for motor vehicles. An eccentrically mounted brake drum results in a varying braking torque, which in turn leads to vibrations in the steering wheel and/or the vehicle passenger compartment, which normally is perceived as very annoying by the driver.

SUMMARY OF THE INVENTION

The object of the present invention is to eliminate the above-mentioned problems regarding rotational units by means of a satisfactory centering, while maintaining favorable qualities for mounting and a reduced risk for it becoming stuck due to rust (fitting rust).

Said object is achieved by means of a device according to the present invention, the characterizing features of which will become apparent from the subsequent disclosure and within claims.

BRIEF DESCRIPTION OF THE DRAWINGS

The invention will now be described in greater detail with an embodiment, with reference to the annexed drawings, in which.

PREFERRED EMBODIMENTS

Figure 1:
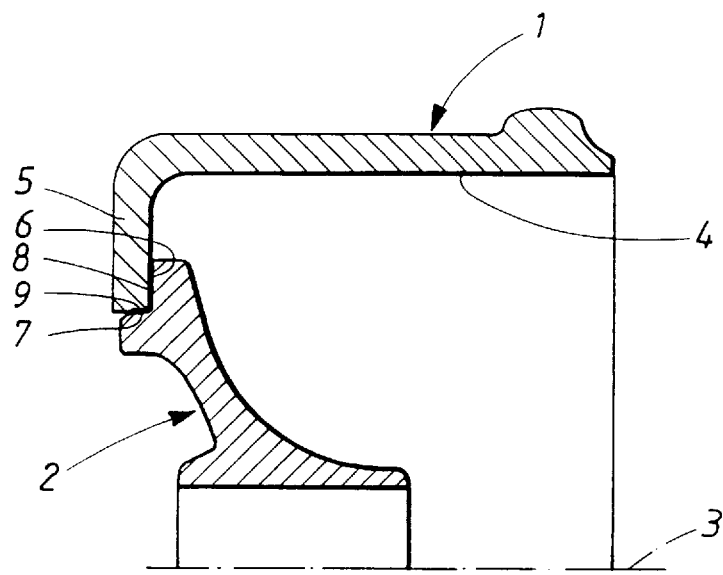
FIG. 1 shows an axial cross-section of a rotational unit in the form of a brake drum mounted on a hub, according to the present invention.

The chosen example shows a rotational unit in the form of a brake drum 1 which is mounted on a hub 2 which is rotatable around a geometric axis 3 of rotation. The hub may be fixed to a (not shown) drive shaft of a motor vehicle, the brake drum 1 being adapted to be rotatably fixed to the hub and thus adapted to rotate together therewith, and thus also together with the drive shaft. The brake drum is normally arranged on the inside of a vehicle wheel and adapted to rotate together with the wheel. The brake drum forms part of a conventional brake system with (not shown) brake shoes which are carried by the vehicle so that they essentially do not rotate with the brake drum but are adapted to brake the vehicle by frictional contact against the cylindrical brake surface 4 of the brake drum, the centricity of which in relation to the axis 3 of rotation is of great importance for the braking function and comfort in the vehicle. The brake drum is a separate rotational unit with a rear section 5 which extends essentially in a radial plane and which presents mounting surfaces 6, 7 intended for cooperation with corresponding mounting surfaces 8, 9 on the hub 2.

Figure 2:
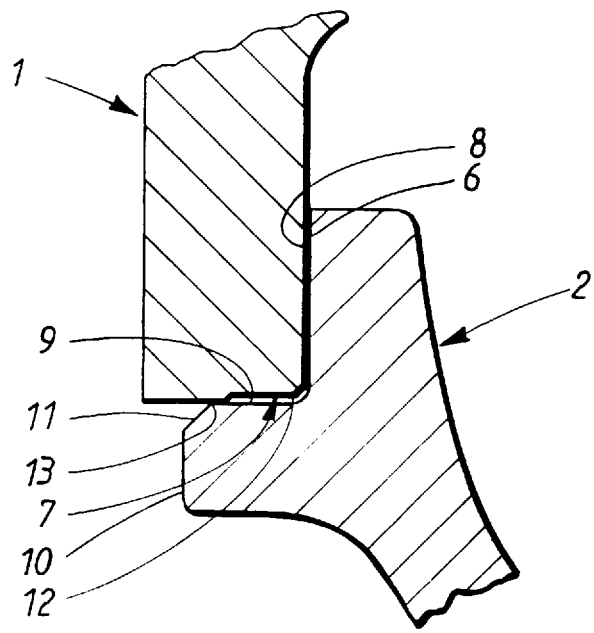
FIG. 2 shows, on a larger scale, a section of the brake drum and the hub.

FIG. 2 shows a slightly enlarged partial view of FIG. 1, which is chosen so that it is apparent which section of the brake drum and the hub forms the mounting surfaces 6–9. The mounting surfaces form guiding surfaces which secure the position of the brake drum, partly for centering, i.e. a guiding in a radial direction, and also for guiding or securing the position in an axial direction. Also, the axis of symmetry and the axis 3 of rotation of the drum should coincide as far as possible, i.e. they should not present any relative angle. The guiding in the axial direction is assured by the first mounting surface 8 of the hub 2, which extends in a radial plane and forms a stop surface for the corresponding mounting surface 6 of the drum 1. The guiding in the radial direction is assured by the centering surface 9 of the hub, which is shaped essentially as a cylinder mantle and which is radially outwardly facing (convex), and also by the centering surface 7 of the drum which is also shaped essentially as a cylinder mantle and as radially inwardly facing (concave) towards the axis 3 of rotation.

Figure 3:
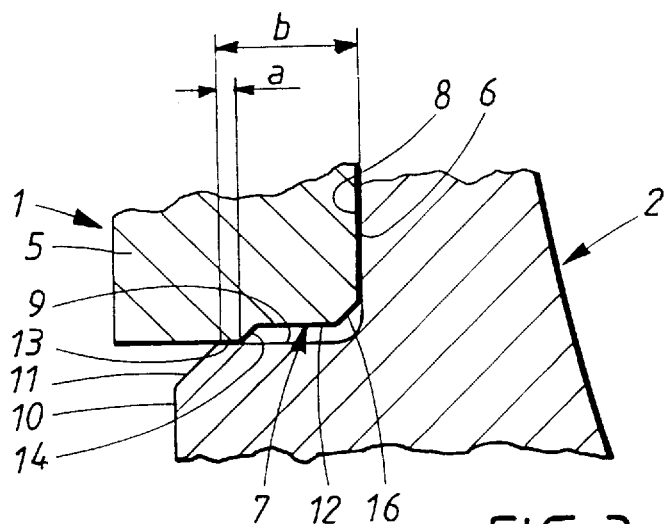
FIG. 3 shows, on a further enlarged scale, a section of the brake drum and the hub clearly showing their mutual mounting surfaces.
Figure 5:
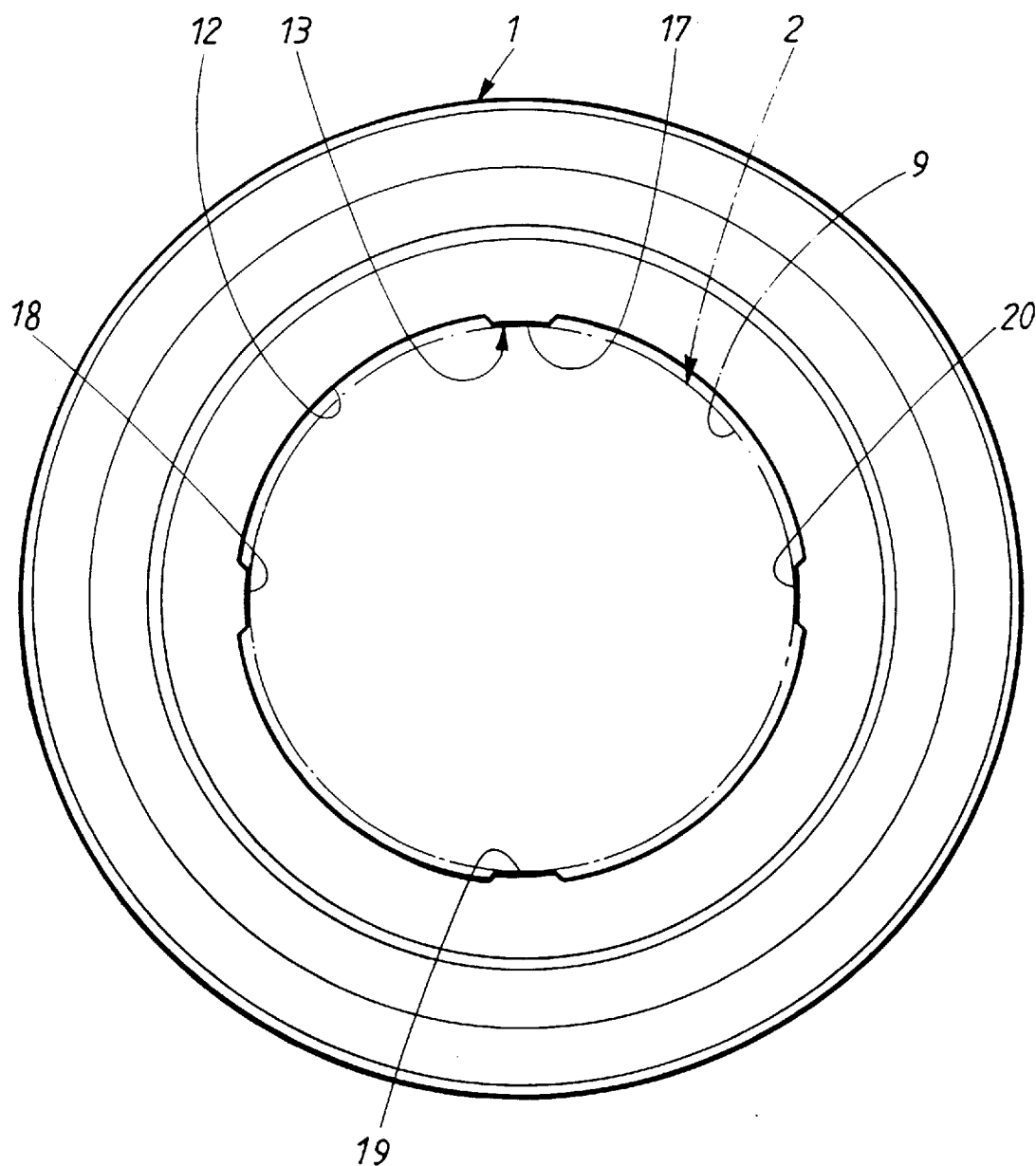
FIG. 5 shows an end view of the brake drum.

The shaping of the mounting surfaces appears in greater detail in FIGS. 3 and 5. From these figures it is apparent that the cylindrical centering surface 9 on the hub extends, as seen in the axial direction, essentially between the stop surface 8 of the hub and the free edge 10 of the hub which presents a sloping section 11 which is shaped as the mantle of a cone in order to facilitate the mounting of the drum 1. The centering surface 7 of the drum, which surface is shaped as a cylinder mantle, is divided according to the invention into two centering sections 12, 13, of which a first centering section 12 is located next to the stop surface 6 of the drum and extends over the main part of the entire centering surface of the drum, i.e. the surface which cooperates with the centering surface 9 of the hub. The first centering section 12, which is shaped essentially as a cylinder mantle, is arranged at a radial distance from the axis 3 of rotation of the drum such that this centering section presents a relatively larger clearance with respect to the centering surface 9 of the hub 2. The second centering section 13 is positioned beyond the first centering section, as seen from the stop surface 6, and is positioned in relation to the first centering section 13 at a somewhat smaller radial distance from the axis 3 of rotation of the drum.

As is apparent from FIG. 5 and according to a preferred embodiment, the centering section 13 is divided into four partial surfaces 17, 18, 19 and 20, each of which only occupying 10°–15° of the mantle surface of an entire cylinder. According to the invention, the second centering section occupies a shorter distance "a" of the active width "b" of the centering surfaces than the first centering section, for example less than a fifth, more precisely for example a tenth of the total width "b" of the centering surface 9 of the hub. In absolute dimensions, for example the width "a" of the second centering section 13 may be approximately 1 mm, whereas the width b of the centering surface 9 of the hub may be approximately 10 mm. The clearance between the drum 1 and the hub 2 over the first centering section 12 may for example be $\Delta_1=0.056 \rightarrow +0.0218$ mm, whereas the corresponding clearance over said second centering section 13 may be for example $\Delta_2=0.08 \rightarrow +0.06$ mm. With the proposed clearance, it has been verified that the radial distorsion has been reduced by approximately 0.05 to approximately 0.1 mm. Due to the fact that the width "a" is chosen so small, the clearance may thus even be negative before the mounting, thereby involving a plastic deformation of the active centering surfaces. During mounting, a deformation of said first and/or second centering section 12, 13 occurs, whereby essentially a zero clearance is obtained, i.e. a full contact between the centering sections 12, 13. The section which is deformed, or deformed the most, depends mainly on the difference in hardness between the centering sections. By intermittently dividing the centering section 13, as is shown in FIG. 5, this deformation is facilitated.

Between the two centering sections 12, 13 there is a transition surface in the form of a sloping surface 14, which has the shape of a cone mantle and which, due to its shape provides a successive transition between the centering sections and thereby also an easier mounting.

Figure 4:
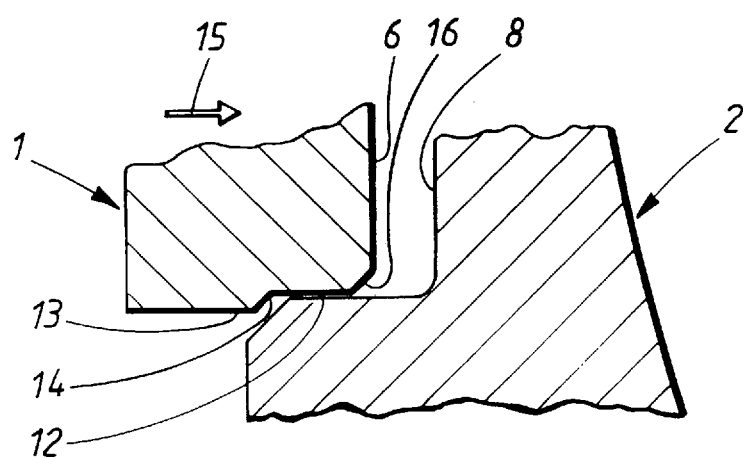
FIG. 4 shows the brake drum and the hub during a first mounting stage.

With the design of the mounting surfaces 6, 7, 8, 9 of the brake drum 1 and the hub 2, respectively, as described above, a considerably improved centering of the brake drum 1 in relation to the axis 3 of rotation of the hub 2 is thus obtained, without making the mounting of the brake drum more difficult. The manner in which the brake drum is mounted on the hub will now be described with reference mainly to FIG. 4. The brake drum 1 is mounted on the hub 1 with an essentially axial lateral movement in the direction of the arrow 15, with assistance firstly from both the sloping edge surface 16 of the drum and the sloping edge surface 11 of the hub, in order to achieve a guiding towards the centering surfaces. Thereafter, the centering section 12 provides a first approximate centering of the drum brake in a first mounting stage, which is shown in FIG. 4. In practice, as is also shown in FIG. 4, the brake drum 1 is not maintained in an entirely correct centered manner in relation to the hub 2, but the first centering section 12 will, at least along some section of its circumference, be in contact with the centering surface 9 of the hub, thus providing an approximate centering of the drum during the main part of the mounting motion of the drum on the hub. In a second and final mounting stage which ends with the stationary mounted condition of the drum which is shown in FIG. 3, a final centering of the drum 1 in relation to the hub 2 is carried out by mounting the second centering section 13 with its smaller clearance on the front section of the centering surface 9 of the hub. In practice, in most cases the drum is mounted by pressing, due to the narrow or even negative tolerances. The press mounting is preferably carried out by tightening screws in screw joints which extend through the drum and the mounting surfaces 6, 8. With negative tolerances, the above-mentioned deformation takes place in the edge and centering surfaces 9, 11, 13, 14, which are pressed towards each other. The guiding to this position is assured by means of the sloping surface 14 which thus forms a transition between the first and the second centering section. A rotationally fixed fastening of the drum to the hub is usually assured by means of the above-mentioned screw joint. For production reasons, the screw joints themselves can not satisfy the demand for centering of the drum.

The invention is not limited to the embodiments mentioned above and shown in the drawings, but may be varied within the scope of the appended claims. For example, the rotational unit 1 may be something else besides a brake drum. Furthermore, the sloping 14 may have another, for example a rounded, cross-sectional line. The surfaces which are shaped as cylinder mantles need not be shaped continously as cylinder mantles, as seen in a radial plane, but may be formed as splines. Furthermore, the mounting surfaces 6, 8 do not have to be continous but may be profiled in order to provide a rotationally fixed form engagement between the drum and the hub. The sloping and thus also the smaller centering section may be arranged in the radially inner part, in the shown example the hub, and is thereby placed closest to the stop surface of the hub, that is, inside of the larger centering section with a greater clearance. The hub is assumed to be the unit which is centrically rotatable around the axis 3 of rotation. However, this does not have to be the radially inner part with a radially outwardly facing centering surface, but may instead be the radially outer unit with a radially inwardly facing centering surface, whereas the rotational unit constitutes the radially inner unit with a radially outwardly facing centering surface. The second centering section 13 may consist of three or more smaller partial surfaces, alternatively an entire cylindrical surface or two larger partial surfaces. In embodiments with one centering section 13 which consists of smaller individual partial surfaces, the distance "a" may be chosen greater than in the case with one single surface. The active area, the tendency to be deformed and the clearance are, together with the coefficient of friction of the surfaces, important parameters which influence the force needed for the mounting.

We claim:

1. A centering device comprising:
   (a) a rotatable hub, having
      (1) a radially outwardly facing circumferential centering surface having first and second ends;
      (2) a hub stop surface extending from said second end of said outwardly facing centering surface; and
      (3) a mounting edge adjacent said first end of said outwardly facing centering surface; and
   (b) a rotational unit mountable on said rotatable hub for rotation therewith, having
      (1) a radially inwardly facing circumferential centering surface for mounting on said radially outwardly facing centering surface of said rotatable hub and thereby determining a relative radial position between said rotatable hub and said rotational unit, said inwardly facing circumferential centering surface having first and second ends; and
      (2) a rotational unit stop surface adjacent said second end of said inwardly facing centering surface for contacting said hub stop surface and thereby determining a relative axial position between said rotatable hub and said rotational unit;
   (c) wherein, in a mounted position, said rotational unit stop surface contacts said hub stop surface, and one of said centering surfaces further comprises
      (1) a first centering section extending a first portion of an axial distance from said hub stop surface to said mounting edge, said first centering section having a first clearance with respect to the other of said centering surfaces; and
      (2) a second centering section extending a second portion of said axial distance from said hub stop surface to said mounting edge, said second centering section having a second clearance with respect to said other of said centering surfaces; said second clearance being smaller than said first clearance; said second portion of said axial distance from said hub stop surface to said mounting edge being smaller than said first portion; and (d) said other of said centering surfaces comprising a single, constant diameter cylindrical mantle;

(e) wherein, as said rotational unit is mounted on said hub, said other of said centering surfaces encounters said first centering section before encountering said second centering section.

2. A centering device as claimed in claim 1, wherein said centering surfaces are shaped substantially as cylinder mantles.

3. A centering device as claimed in claim 1, further comprising a transition between the centering sections having a sloping surface.

4. A centering device as claimed in claim 1, wherein said second portion of said axial distance between said hub stop surface and said mounting edge is less than a fifth of a total axial distance between said hub stop surface and said mounting edge.

5. A centering device as claimed in claim 1, wherein said second centering section is divided into several partial surfaces.

6. A centering device as claimed in claim 5, wherein the partial surfaces occupy a minor section of a total circumference of said second centering section.

7. A centering device as claimed in claim 6, wherein the partial surfaces are at least three in number.

8. A centering device as claimed in claim 6, wherein the partial surfaces are symmetrically distributed around said circumference.

9. A centering device as claimed in claim 6, wherein each of the partial surfaces occupies approximately 10°–15° of said circumference.

10. A centering device as claimed in claim 1, wherein said second clearance is negative before the mounting, and at least one of said first and second centering surfaces is adapted to be deformed essentially to a zero clearance during the mounting.

11. A centering device comprising:

(a) a rotatable hub, having
 (1) a radially outwardly facing circumferential centering surface having first and second ends;
 (2) a hub stop surface extending from said second end of said outwardly facing centering surface; and
 (3) a mounting edge adjacent said first end of said outwardly facing centering surface; and (b) a rotational unit mountable on said rotatable hub for rotation therewith, having
 (1) a radially inwardly facing circumferential centering surface for mounting on said radially outwardly facing centering surface of said rotatable hub and thereby determining a relative radial position between said rotatable hub and said rotational unit, said inwardly facing circumferential centering surface having first and second ends; and
 (2) a rotational unit stop surface adjacent said second end of said inwardly facing centering surface for contacting said hub stop surface and thereby determining a relative axial position between said rotatable hub and said rotational unit;

(c) wherein, in a mounted position, one of said centering surfaces further comprises
 (1) a first centering section extending a first portion of an axial distance from said hub stop surface to said mounting edge, said first centering section having a first clearance with respect to the other of said centering surfaces; and
 (2) a second centering section divided into several partial surfaces occupying a minor section of a total circumference of said second centering section and extending a second portion of said axial distance from said hub stop surface to said mounting edge, said second centering section having a second clearance with respect to said other of said centering surfaces; said second clearance being smaller than said first clearance; said second portion of said axial distance from said hub stop surface to said mounting edge being smaller than said first portion; and (d) wherein, as said rotational unit is mounted on said hub, said other of said centering surfaces encounters said first centering section before encountering said second centering section.

12. A centering device as claimed in claim 11, further comprising a transition between the centering sections having a sloping surface.

13. A centering device as claimed in claim 11, wherein said second portion of said axial distance between said hub stop surface and said mounting edge is less than a fifth of a total axial distance between said hub stop surface and said mounting edge.

14. A centering device as claimed in claim 11, wherein the partial surfaces are at least three in number.

15. A centering device as claimed in claim 11, wherein the partial surfaces are symmetrically distributed around said circumference.

16. A centering device as claimed in claim 11, wherein each of the partial surfaces occupies approximately 10°–15° of said circumference.

17. A centering device as claimed in claim 11, wherein said second clearance is negative before the mounting, and at least one of said first and second centering surfaces is adapted to be deformed essentially to a zero clearance during the mounting.

* * * * *

UNITED STATES PATENT AND TRADEMARK OFFICE
CERTIFICATE OF CORRECTION

PATENT NO. : 5,855,444
DATED : January 5, 1999
INVENTOR(S) : Ohlson et al.

It is certified that error appears in the above-identified patent and that said Letters Patent is hereby corrected as shown below:

Column 3, line 8, "0.056" should read --+0.056--.

Column 3, line 8, "+0.0218" should read --+0.218--.

Column 3, line 10, "0.08" should read -- -0.08--.

Signed and Sealed this

Eighteenth Day of May, 1999

Attest:

Q. TODD DICKINSON

*Attesting Officer*  *Acting Commissioner of Patents and Trademarks*